(No Model.)
J. S. KLAPPERICH.
FIFTH WHEEL FOR VEHICLES.
No. 287,550. Patented Oct. 30, 1883.
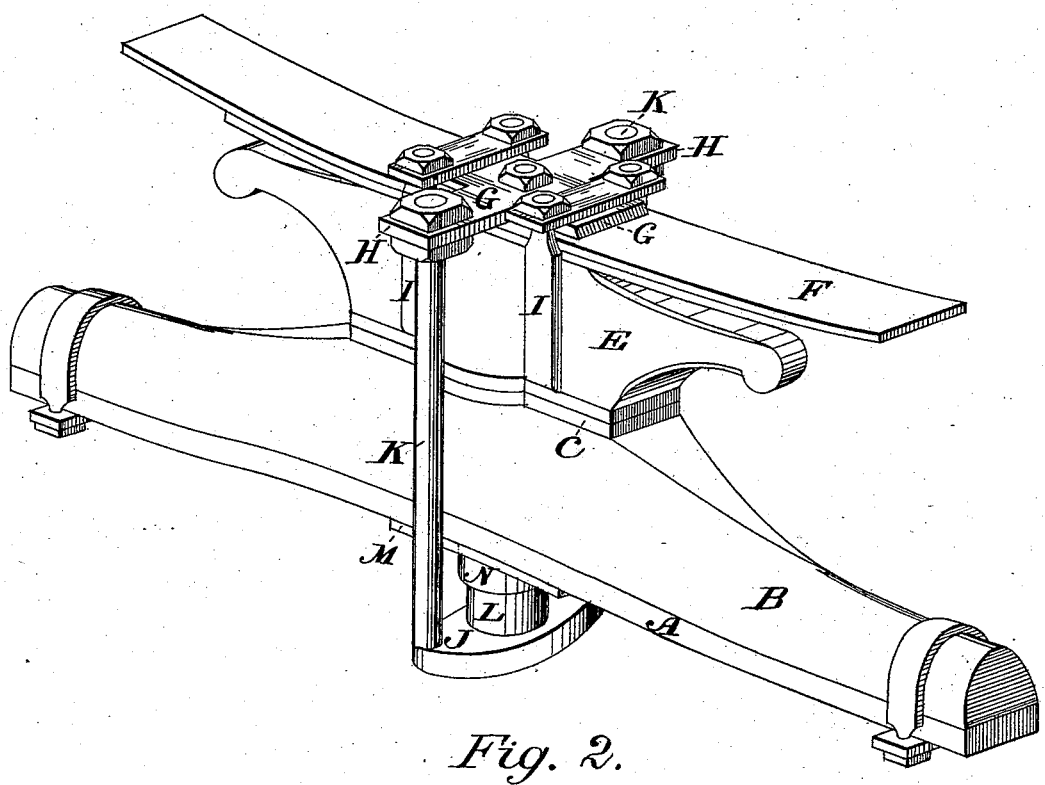
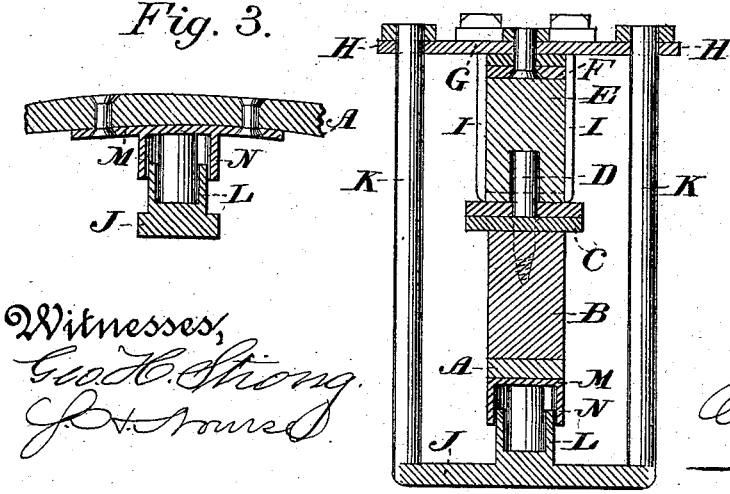

UNITED STATES PATENT OFFICE.

JOHN S. KLAPPERICH, OF SAN FRANCISCO, CALIFORNIA.

FIFTH-WHEEL FOR VEHICLES.

SPECIFICATION forming part of Letters Patent No. 287,550, dated October 30, 1883.

Application filed August 4, 1883. (No model.)

*To all whom it may concern:*

Be it known that I, JOHN S. KLAPPERICH, of the city and county of San Francisco, and State of California, have invented an Improvement in Fifth-Wheels for Vehicles; and I hereby declare the following to be a full, clear, and exact description thereof.

My invention relates to certain improvements in the running-gear of vehicles; and it consists of a means for connecting the front axle and bolster, so that they can be turned about a central point, without the use of a king-bolt to extend through and weaken the axle, as will be more fully explained by reference to the accompanying drawings, in which—

Figure 1 is a perspective view of my device. Fig. 2 is a transverse section taken through the center of my device. Fig. 3 is a section taken longitudinally through the axle A, showing how plate M is secured.

A is the axle of a vehicle, made of iron or steel, and B is the wooden axle-bed, to which it is secured by clips in the usual manner. Upon the top of this bed, in the center, is secured a wear-plate, C, having a short pin, D, projecting upward from it. The bolster E has a similar plate secured to it, and having a hole in the center, into which the pin D extends when the parts are in place together. The spring F rests upon the bolster, and a plate, G, with lugs H projecting in front and behind, rests upon the spring, and is clipped with it to the bolster by bolts I, as shown. A plate, J, extends from front to rear beneath the center of the axle, and has rods or bolts K extending from it up through holes in the lugs H of the plate G, where they are secured by nuts which screw down upon them. The plate J has a cup, L, formed upon it, and another plate, M, is secured above it beneath the axle, having a corresponding cup, N, which is large enough to slip outside the cup L, as shown. Within the cup L is placed an elastic spring or cushion, in the present case shown of rubber.

When the parts are in place and the rods or bolts K secured in the lugs H of the plate G above the bolster and spring, the pin D will enter the plate below the bolster, and the cup N will fit over the cup L, so as to keep the parts together and act as a guide. When the front wheels of the vehicle are turned by the movement of the pole or shafts, the axle will be turned beneath the bolster, the cups L and N and the pin D serving as a guide or center about which the motion takes place, while the rods or bolts K hold the axle and bolster firmly together. By this construction I avoid the use of a king-bolt, and the consequent weakening of the axle.

Having thus described my invention, what I claim as new, and desire to secure by Letters Patent, is—

1. In a vehicle, and in combination with the front axle and bolster, a yoke extending from a point beneath the axle to a plate above the bolster, to connect the two, and having a cup with an elastic cushion centrally beneath the axle, together with a second cup fixed beneath the axle and fitting over the first one, substantially as herein described.

2. In a vehicle, a means for uniting the front axle and bolster, consisting of a pin or bolt projecting upward into the bolster from the axle, and a yoke having its arms extending up in front of and behind the axle, and having the telescopic cups or tubes and elastic packing beneath the axle, substantially as herein described.

In witness whereof I have hereunto set my hand.

JOHN S. KLAPPERICH.

Witnesses:
S. H. NOURSE,
H. C. LEE.